US008881704B2

(12) United States Patent
Neuburger et al.

(10) Patent No.: US 8,881,704 B2
(45) Date of Patent: Nov. 11, 2014

(54) METHOD AND DEVICE OF A START-STOP CONTROL FOR AN INTERNAL COMBUSTION ENGINE

(75) Inventors: Martin Neuburger, Geislingen (DE); Karl-Otto Schmidt, Keltern (DE); Apostolos Tsakiris, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 829 days.

(21) Appl. No.: 12/737,603

(22) PCT Filed: Jun. 2, 2009

(86) PCT No.: PCT/EP2009/056707
§ 371 (c)(1),
(2), (4) Date: Apr. 11, 2011

(87) PCT Pub. No.: WO2010/012530
PCT Pub. Date: Feb. 4, 2010

(65) Prior Publication Data
US 2011/0174255 A1    Jul. 21, 2011

(30) Foreign Application Priority Data

Jul. 29, 2008   (DE) .......................... 10 2008 040 830

(51) Int. Cl.
| F02N 11/08 | (2006.01) |
|---|---|
| B60L 3/00 | (2006.01) |
| B60L 11/14 | (2006.01) |
| F02D 41/06 | (2006.01) |
| F02N 15/00 | (2006.01) |
| F02D 41/00 | (2006.01) |
| F02N 15/06 | (2006.01) |
| F02D 41/04 | (2006.01) |

(52) U.S. Cl.
CPC ....... *F02N 11/0844* (2013.01); *B60L 2240/441* (2013.01); *Y02T 10/48* (2013.01); *B60L 2240/421* (2013.01); *F02D 41/065* (2013.01); *F02N 15/003* (2013.01); *Y02T 10/642* (2013.01); *F02D 2041/0095* (2013.01); *B60L 3/0046* (2013.01); *F02N 15/067* (2013.01); *B60L 2210/40* (2013.01); *Y02T 10/7077* (2013.01); *B60L 11/14* (2013.01); *Y02T 10/7241* (2013.01); *F02N 11/0855* (2013.01); *F02D 41/042* (2013.01); *B60L 2270/20* (2013.01)
USPC .................................... 123/179.3; 123/179.4

(58) Field of Classification Search
CPC ... F02D 41/042; F02D 41/065; F02D 41/062; F02D 41/08; B60W 10/06; F02N 11/0851; F02N 11/0855; F02N 19/001
USPC ........... 123/179.3, 179.4, 179.14, 491, 185.5, 123/185.6; 701/113
See application file for complete search history.

(56) References Cited

U.S. PATENT DOCUMENTS

| 7,665,438 B2 | 2/2010 | Hirning et al. |
|---|---|---|
| 2004/0200448 A1 | 10/2004 | Kojima et al. |

(Continued)

FOREIGN PATENT DOCUMENTS

| DE | 10 2005 004 326 | 2/2006 |
|---|---|---|
| DE | 10 2005 021 227 | 11/2006 |

(Continued)

*Primary Examiner* — Erick Solis
*Assistant Examiner* — Carl Staubach
(74) *Attorney, Agent, or Firm* — Kenyon & Kenyon LLP (57) ABSTRACT

In a method of a start-stop control for an internal combustion engine including briefly stopping and starting the internal combustion engine using an electric machine as a starter, the internal combustion engine is switched off by an engine control when switch-off conditions obtain, and the start-stop control queries whether a start signal exists on the basis of switch-on conditions. In order to ensure that a restart of the internal combustion engine is able to be performed more quickly, the start-stop control acts on the internal combustion engine using an operating strategy within a time period t until the internal combustion engine comes to a standstill.

5 Claims, 4 Drawing Sheets

(56) References Cited

U.S. PATENT DOCUMENTS

| | | |
|---|---|---|
| 2004/0221828 A1 | 11/2004 | Ries-Mueller et al. |
| 2009/0020091 A1 | 1/2009 | Botzenhard et al. |
| 2010/0064786 A1 | 3/2010 | Ge et al. |
| 2010/0282199 A1 | 11/2010 | Heyers et al. |
| 2011/0118962 A1* | 5/2011 | Couetoux et al. ............ 701/113 |

FOREIGN PATENT DOCUMENTS

| | | | | |
|---|---|---|---|---|
| DE | 10 2006 011 644 | 9/2007 | | |
| DE | 10 2006 039 112 | 2/2008 | | |
| EP | 1 770 266 | 4/2007 | | |
| FR | 2 925 977 | 7/2009 | | |
| JP | 3-37373 | 2/1991 | | |
| JP | 2002-70699 | 3/2002 | | |
| JP | 2002-147264 | 5/2002 | | |
| JP | 2004-245219 | 9/2004 | | |
| JP | 2004-263566 | 9/2004 | | |
| JP | 2005-330813 | 12/2005 | | |
| JP | 2007-23815 | 2/2007 | | |
| WO | WO 2004/067949 | 8/2004 | | |
| WO | WO 2006/018350 | 2/2006 | | |
| WO | WO 2006/120180 | * 11/2006 | ............ | F02N 11/08 |
| WO | WO 2007/101770 | * 9/2007 | ............ | F02N 11/08 |
| WO | WO 2008/022841 | 2/2008 | | |
| WO | WO 2009/083477 | 7/2009 | | |

\* cited by examiner

METHOD AND DEVICE OF A START-STOP CONTROL FOR AN INTERNAL COMBUSTION ENGINE

BACKGROUND OF THE INVENTION

1. Field of the Invention

The present invention relates to a method of a start-stop control for an internal combustion engine in a vehicle for briefly stopping the internal combustion engine and starting the internal combustion engine, in particular by using an electric machine as a starter, the internal combustion engine being switched off by an engine control when switch-off conditions obtain and the start-stop control querying whether a start signal exists on the basis of switch-on conditions. The present invention also relates to a computer program product as well as a start-stop control for an internal combustion engine in a vehicle.

2. Description of the Related Art

In order to save fuel and emissions, it is known for an engine control to switch off the internal combustion engine in a vehicle according to particular switch-off conditions, in particular following a specific time lapse, for example at traffic lights or at other traffic impediments that necessitate a brief stop. Usually, an internal combustion engine is started by a starter, which has a starter pinion that is engaged into a ring gear of an internal combustion engine. For such constructions of an internal combustion engine, as are started with the aid of a starter pinion, there are minimum time periods for a restart, which must be awaited before the internal combustion engine may be started again.

In addition to classical starters having a starter pinion, belt starters, integrated starters, hybrid drives having a switchable clutch between the electric machine and the internal combustion engine are also known. In the latter constructions, the engagement location for the starter on the internal combustion engine thus varies such that the internal combustion engine is started via a starter pinion, a crankshaft, or via the drive train.

Published German patent application document DE 10 2006 011 644 A1 describes a device and a method for operating a device having a starter pinion and a ring gear of an internal combustion engine, the rotational speed of the ring gear and of the starter pinion being ascertained in order, following the shutdown of the internal combustion engine, to engage the starter pinion at the essentially identical rotational speed as the internal combustion engine is running down. The starter pinion remains in an engaged state until the internal combustion engine is started.

Published German patent application document DE 10 2006 039 112 A1 describes a method for determining the rotational speed of the starter for an internal combustion engine of a motor vehicle. Furthermore, there is the description that the starter comprises a starter control unit of its own to calculate the rotational speed of the starter in order to accelerate the pinion of the starter in a start-stop operation if a self-start of the internal combustion engine is no longer possible due to the reduced rotational speed. The pinion is engaged at a synchronous rotational speed into the ring gear of the internal combustion engine as the latter is running down.

Published German patent application document DE 10 2005 004 326 describes a starting device for an internal combustion engine having a separate engaging and starting process. For this purpose, the starting device has a control unit, which separately controls a starter motor and an actuator for engaging a starter pinion. The control unit is able to engage the pinion into the ring gear prior to a starting process of the vehicle, before the driver has issued a new starting request. For this purpose, the actuator is triggered as an engaging relay already during a run-down phase of the internal combustion engine. The rotational speed threshold here is far below the idling speed of the engine so as to minimize the wear of the engaging device. In order to avoid voltage drops by a very high starting current of the starter motor, the control provides a gentle start, for example by clocking the starter current. The performance of the vehicle electrical system is monitored by analyzing the state of the battery, and the starter motor is clocked or supplied with current accordingly. Furthermore, the invention describes that the crankshaft may be positioned when the internal combustion engine is at a standstill so as to shorten the starting time.

Published German patent application document DE 10 2005 021 227 A1 describes a starting device for an internal combustion engine in motor vehicles having a control unit, a starter relay, a starter pinion, and a starter motor. For a start-stop operating strategy, the armature of the start relay may be advanced at reduced force by a controlled energization in order to engage the starter pinion into a ring gear of the internal combustion engine in a first stage, while in a second stage a switching contact is closed with the full force of the armature in order to supply maximum energy to the starter motor. The starter motor is started via a transistor in the control unit using a controlled current when engaging the starter pinion so that, in the event of a tooth-upon-tooth position, the starter pinion is wound gently into the next tooth gap in the ring gear.

BRIEF SUMMARY OF THE INVENTION

It is an objective of the present invention to develop a method, a computer program product and a start-stop control of the kind mentioned at the outset in such a way that a vehicle comfort is improved in that a restart of the internal combustion engine may be performed considerably more quickly.

One idea of the present invention is to implement in the start-stop control, as the possible start time of the internal combustion engine, the time in which the internal combustion engine is running down based on switch-off conditions. This allows for a rapid change in the vehicle operation.

The objective is achieved in terms of a method in that the start-stop control acts on the internal combustion engine using an operating strategy within a time period until the internal combustion engine comes to a standstill. Thus an increase in comfort and a reduction of waiting times at traffic lights and similar traffic impediments is achieved in that, on account of a particular operating strategy, the start-stop control is able to start the internal combustion engine again while it is still running down. This method may be applied to conventional vehicles having a starter with a starter pinion as well as to belt starters or integrated starters or full hybrid vehicles having a starter in the drive train, which at the same time functions as a generator. It is thus possible to react very quickly to a quickly changing driver request without the driver having to wait long. A vehicle using a method according to the present invention implemented in the start-stop control thus presents no traffic impediment since the internal combustion engine is able to be started more quickly.

In order to save resources and to increase the service life of the drive components and thus of the starter without having to forgo an optimized start-stop control, the start-stop control selects a particular operating strategy as a function of the time period from the switch-off signal of the internal combustion engine and/or as a function of the running down rotational speed of the internal combustion engine until the time of a detected start signal. Thus it is possible to adapt the operating strategy individually according to the type of internal combustion engine and to determine in the operating strategy whether it is even necessary to start the internal combustion engine with the aid an electric machine.

According to one specific embodiment developing the present invention, the start-stop control selects an operating strategy having a defined specification regarding a time and/or a duration of an energization, in particular the magnitude of energization, of the electric machine and in particular regarding the use of a braking device for the electric machine. Thus it is possible to ascertain individually an operating strategy as a function of the vehicle type and particular defined drive components from empirical values, which operating strategy defines the time of the energization of an electric machine as well as the duration and/or the magnitude. The operating strategy may be adapted to the manufacturer's request and to the driver's request, for example, whether he desires a long service life of the drive components or whether it is important that the internal combustion engine be ready for use more quickly.

Furthermore, the start-stop control preferably selects an operating strategy with a defined specification regarding the time of an actuation of a clutch device, by which the starter as an electric machine and the internal combustion engine are mechanically connectible. This has the advantage of defining, as a function of the individually adjusted operating strategy, whether the starter is to be engaged early with the internal combustion engine or only after the occurrence of certain events such as a start signal, for example.

In order to adapt the operating strategy even more individually to the drive components such as the electric machine, for example, and to conform to possible requests on the part of the vehicle manufacturers or the drivers of the vehicle, for example in order to implement a desired change in the operating behavior of the internal combustion engine as quickly as possible, the start-stop control may preferably select an operating strategy having a defined specification regarding the time of the switch-off of the internal combustion engine. The internal combustion engine is thus switched off in a timely manner for example not only because switch-off conditions known from the related art obtain, but rather new switch-off conditions may be defined, which are tied for example to particular events as e.g. to starting a starter or to engaging the starter with the internal combustion engine.

According to a first preferred specific embodiment, the start-stop control checks whether a start signal is detected within a first time period $t_1$, in which the internal combustion engine is able to be started by itself and accelerated to an idling speed. This first operating strategy is particularly advantageous since no additional electric machine has to be activated in order start the internal combustion engine. The internal combustion engine is thus able to perform a restart, after the engine control has received a switch-off signal "engine off", before the internal combustion engine comes to a standstill. The internal combustion engine may be switched off by various measures. For example by interrupting the supply of a combustible mixture or interrupting the ignition. Using a closed throttle valve, the internal combustion engine performs a linear decrease in engine speed. Because the engine control again receives a start signal within a short time period, within which the internal combustion engine is not yet at a standstill, the engine control is able to revoke the previously initiated measures such that the internal combustion engine is again able to accelerate autonomously by its own power. The start-stop control thus makes it possible to implement quickly a so-called "change of mind", a change of the operating request according to the first operating strategy.

According to one specific embodiment developing the present invention and a second special operating strategy, following the expiry of a second time period $t_2$, in which no start signal was detected by the start-stop control, the second time period $t_2$ being greater than the first time period $t_1$, an operating strategy acts on the starter and a clutch device connecting the starter and the internal combustion engine mechanically in such a way that the starter is energized and accelerates. Furthermore, a check is performed as to whether a start signal is detected within a third time period $t_3$ in order to actuate a clutch device for engaging the starter with the internal combustion engine. According to this special operating strategy, the assumption is that the starter requires a certain time in order to reach a particular rotational speed, by which the internal combustion engine is started more quickly. Thus the clutch device is actuated if a start signal is detected within a specific third time period $t_3$.

A clutch device comprises a conventional multidisk clutch, which is disposed for example as the clutch of a hybrid drive between the electric machine and the internal combustion engine. The clutch device alternatively also comprises a gearing system having a conventional starter pinion, which is engaged into a ring gear of an internal combustion engine. The engagement only following a start signal within a specific time period reduces wear since the relative rotational speeds between the electric machine and the internal combustion engine occur less frequently since the clutch device only engages, for example by actuating a multidisk clutch or engaging a starter pinion, when a start signal actually exists.

Since the starter requires a certain time in order to achieve a specific rotational speed, according to another preferred specific embodiment, the starter is supplied with only a fraction, for example 50%, of the power and the start-stop control checks whether a start signal is detected within a fourth time period $t_4$ so as to accelerate the rotational speed of the starter to a decreasing rotational speed of the internal combustion engine such that using the clutch device the starter is engaged with the internal combustion engine at an essentially synchronous rotational speed. The starter is thus energized at the time of a switch-off signal of the internal combustion engine or at a later time in response to a so-called preventive suspicion in order to start the internal combustion engine more quickly in the event that a start signal is detected. According to this operating strategy as well, the clutch device is only actuated if a start signal is detected within a specific fourth time period $t_4$. In the positive case, the rotational speed for synchronous engagement is reached earlier. Because of the lower energization, the starter reaches a constant lower rotational speed, which is lower than the final rotational speed.

Furthermore, the starter is preferably supplied with a fraction of the power until, in the event of an absent start signal up to a fourth time period $t_4$ or deviating from time period $t_4$, the starter is switched off such that the starter together with the switched-off internal combustion engine comes to a standstill at essentially the same time. This has the advantage that the internal combustion engine is able to be started immediately after the standstill. This is important because the internal combustion engine, due to a so-called drag torque or due to friction, has a greater negative acceleration, i.e. a faster reduction of the rotational speed than a starter that is not yet mechanically connected to the internal combustion engine via the clutch device. Otherwise, the starter would come to a standstill later than the internal combustion engine and could thus be engaged by a starter pinion only after a delay when the starter pinion is at a standstill.

According to one specific embodiment developing the present invention, in order to achieve a synchronous rotational speed of the starter and the internal combustion engine earlier, in particular in the case of a starter having a starter pinion, the starter is energized essentially at the same time as the switch-off signal of the internal combustion engine, and the start-stop control checks whether a start signal is detected within a fifth time period $t_5$. If no start signal occurs within the fifth time period $t_5$, then the starter is no longer energized such that it comes to a standstill essentially simultaneously as the idling speed of the internal combustion engine decreases. In order to minimize the wear of gearing parts of the starter and the internal combustion engine and for the clutch device to have the longest possible service life, the starter is preferably connected to the internal combustion engine by the clutch device when reaching a synchronous rotational speed.

According to an alternative operating strategy, due to a relative long starting time of a starter until it reaches the order of magnitude of the rotational speed of the internal combustion engine, preferably after the starter is energized for acceleration essentially simultaneously as the stop signal of the internal combustion engine, the internal combustion engine is switched off after a defined sixth time period $t_6$ such that within the seventh time period $t_7$ after the occurrence of the start signal, the starter and the internal combustion engine are mechanically connected by the clutch device essentially at an identical rotational speed. Because of the delayed switch-off of the internal combustion engine, after the starter has been started, the rotational speed of the internal combustion engine is able to reach a synchronous rotational speed earlier such that the time for starting the internal combustion engine is shortened because for example an engagement of a starter pinion into a ring gear via the clutch device is possible earlier.

According to another preferred specific embodiment, since the starter when not energized runs down more slowly than the internal combustion engine, the starter is braked by a braking device to a rotational speed that is synchronous with the internal combustion engine. Thus the rotational speed of the starter may be reduced by the braking device for a longer time over the speed parallel to the rotational speed of the internal combustion engine. The starter is ready for operation for a longer time in order to establish a mechanical connection using the clutch device for example by engaging a starter pinion into the ring gear. The braking device may be developed mechanically for example as a multidisk brake or electromechanically, including activation by a starter control.

The objective is also achieved by a computer program product, which is loadable into a program memory with program instructions, in order to perform all of the steps of at least one of the above-described methods when the program is executed in a start-stop control.

The computer program product requires no additional components in the vehicle, but may rather be implemented as a module in already existing controls in the vehicle. The computer program product may be provided for example in the engine control, a hybrid control, or a starter control. The computer program product has the additional advantage that it is readily adaptable to individual and particular customer requests, and that an improvement of the operating strategy by improved empirical values is possible or that individually provided values are adaptable in the vehicle.

Furthermore, the objective is also achieved by a start-stop control for an internal combustion engine in a vehicle in that the start-stop control has a microcomputer including a program memory, into which the above-described computer program product is loadable in order to execute at least one of the above-described methods. The start-stop control furthermore has a timer in order to be able to trigger defined operating strategies as a function of defined time periods. The start-stop control may be developed as a separate control in the vehicle. For reasons of costs or to save space, it may also be developed as a component in the engine control, a starter control, or a hybrid control.

It is understood that the features mentioned above and still to be explained below are applicable not only in the respectively indicated combination, but also in other combinations.

DETAILED DESCRIPTION OF THE INVENTION

Figure 1:
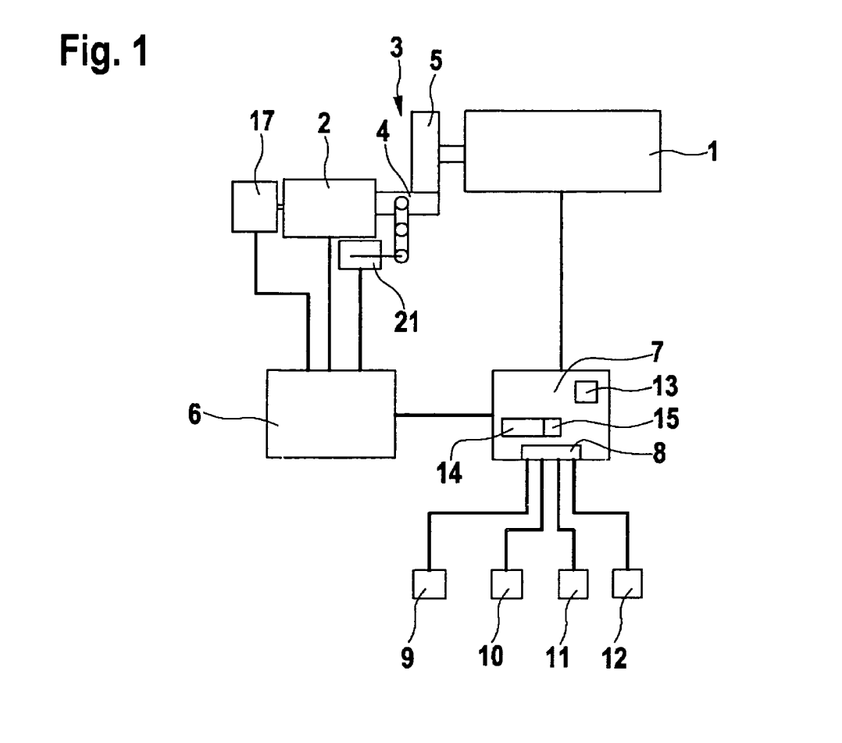
FIG. 1 shows a schematic circuit diagram of drive components of a vehicle

FIG. 1 schematically shows a circuit diagram of drive components in a vehicle having an internal combustion engine 1 and an electric machine, which functions as a starter 2 for internal combustion engine 1. Between starter 2 and internal combustion engine 1, a clutch device 3 is developed as a switchable mechanical connection, which in the particularly preferred specific embodiment shown in FIG. 1 comprises a starter pinion 4 and a ring gear 5 of internal combustion engine 1. Clutch device 3 furthermore includes an engaging relay 21, which engages starter pinion 4 into ring gear 5 or disengages it again following the starting process. Clutch device 3, i.e. engaging relay 21, is controlled in a defined manner by a starter control 6.

According to the method presented in the following, clutch device 3 is controlled as a defined operating strategy separately by starter device 6 for energizing starter 2. Internal combustion engine 1 is controlled by an electronic engine control 7. Engine control 7 has interfaces 8, which receive signals from an accelerator pedal 9, a gear selection sensor 10, which includes the clutch pedal, a brake pedal 11, and additional sensors such as for example speed sensors of the vehicle and a rotational speed sensor of internal combustion engine 1. From the information of the signals arriving at engine control 7 via interface 8, switch-off and switch-on conditions are derived as start signals of internal combustion engine 1.

According to the specific embodiment preferably shown in FIG. 1, a start-stop control 14 is integrated as a module in engine control 7. This has the advantage that essential elements for start-stop control 14 already exist as electronic components in engine control 7. Engine control 7 has a timer 13 that is important for start-stop control 14.

Start-stop control 14 thus comprises a program memory 15, into which a computer program product may be loaded in order to execute the methods to be described in the following as different operating strategies for a start-stop operation of internal combustion engine 1 using program instructions. Switch-off conditions are defined in start-stop control 14, according to which engine control 7 switches internal combustion engine 1 off. Engine control 7 transmits signals to start-stop control 14 in order to detect whether a start signal exists on the basis of defined switch-on conditions and thus whether internal combustion engine 1 must be restarted. Start-stop control 14 decides, by communicating with engine control 7, whether for starting internal combustion engine 1 it is necessary to make use of the electric machine as a starter 2 having a starter control 6, or whether, according to a first operating strategy, internal combustion engine 1 is still able to start by itself.

Start-stop control 14 is thus in direct informational contact with starter control 6 via electrical lines, which may also comprise a bus system, as is conventionally known as CAN or LIN. Start-stop control 14 may also be developed separately from engine control 7 and starter control 6. On the basis of informational signals from the start-stop control, starter control 6 is able to energize starter 2 in a defined manner in terms of time, amperage, and voltage.

In the following figures, various operating strategies are explained, which start-stop control 14 executes, and which are implemented in addition to conventional start-stop operating strategies. The conventional start-stop operating strategies according to the related art refer to states, in which internal combustion engine 1 has come to a standstill, in particular a few seconds or minutes prior, and the starter stands still as well.

In the following, by contrast, operating strategies according to the present invention are presented, which are used by start-stop control 14 within a limited time period, that is, until the internal combustion engine comes to a standstill in terms of its rotational speed. In this limited time period, the following start-stop operating strategies are improved and utilized.

Figure 2:
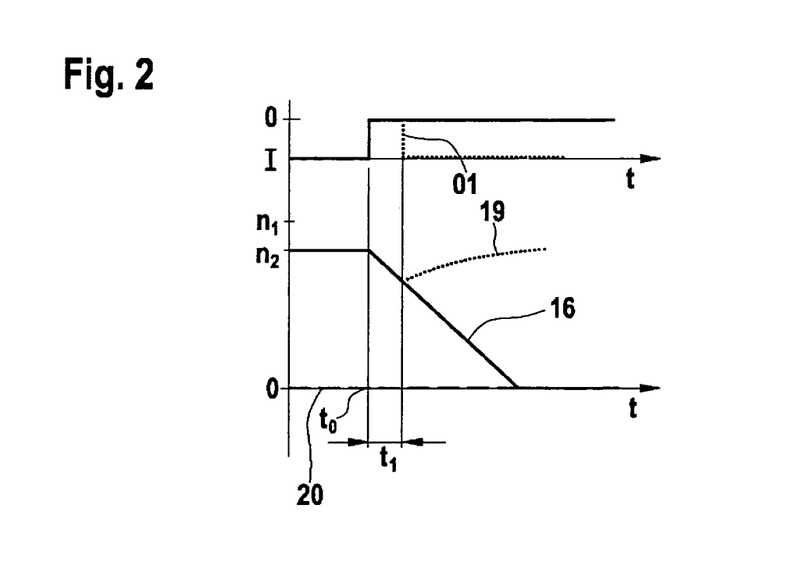
FIG. 2 shows a time-rotational speed diagram according to a first operating strategy

FIG. 2 shows a time-rotational speed diagram with the rotational speed of starter 2 indicated as a dashed characteristic curve 20 and the rotational speed of internal combustion engine 1 as a solid thick characteristic curve 16. Just above, the switching signals of internal combustion engine 1, which are triggered by engine control 7, are represented by 0 and I.

FIG. 2 shows that at time $t_0$, internal combustion engine 1 is switched off with the change of the start signal from I to 0. Idling speed $n_1$ of internal combustion engine 1 thus falls to 0 in accordance with characteristic curve 16. Rotational speed $n_2$ of characteristic curve 20 of starter 2 is always equal to 0 over the entire time period. Up to a first time period $t_1$, internal combustion engine 1 is able to be started autonomously by its own power and idling speed $n_1$ may be reached again autonomously. For this reason, according to a first operating strategy, start-stop control 14 checks whether a start signal is detected within a first time period $t_1$. If a start signal, as shown by dotted line 01, is detected within time period $t_1$, then rotational speed $n_1$ of internal combustion engine 1 follows according to dotted characteristic curve 19. If no start signal follows, then rotational speed $n_1$ of internal combustion engine 1 falls to a standstill 0, as shown in characteristic curve 16. After the expiration of the entire time period, in which starter 2 and internal combustion engine 1 are at a standstill, internal combustion engine 1 may be started in accordance with a conventional starting method.

Figure 3:
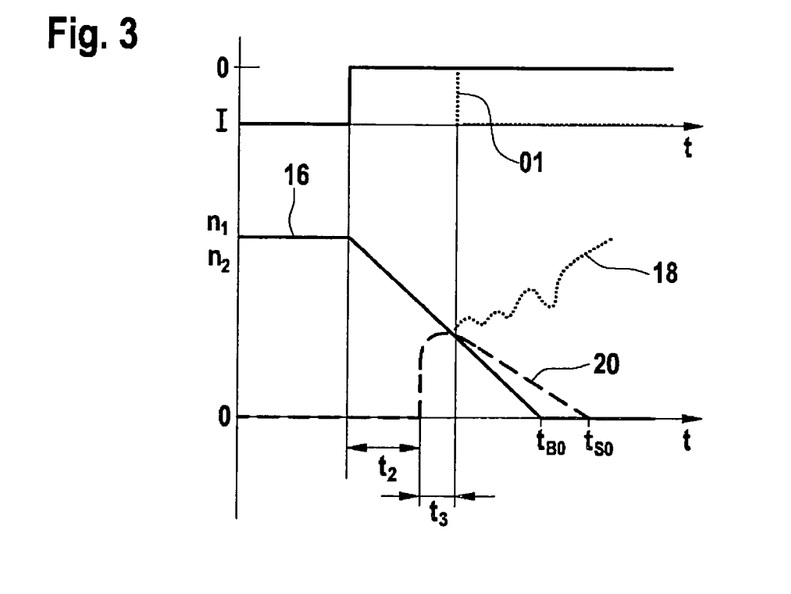
FIG. 3 shows a time-rotational speed diagram according to a second operating strategy.

FIG. 3 shows a time-rotational speed diagram with the time-switching signal diagram of internal combustion engine 1 above it. According to a second operating strategy, starter 2 is generally energized and accelerated after the expiration of a second time period $t_2$ or upon undershooting a specific rotational speed $n_1$ of internal combustion engine 1.

If during a third time period $t_3$, a start request occurs in accordance with dotted line 01, which is detected by engine control 7, then this is transmitted to start-stop control 14 as a start signal and starter pinion 4 is engaged by clutch device 3 into ring gear 5 of internal combustion engine 1 at an approximately identical rotational speed n such that subsequently internal combustion engine 1 is started as shown in dotted characteristic curve 18 by additional energization of starter 2.

If no start signal is detected by the end of time period $t_3$, then starter 2 is no longer energized and starter 2 is allowed to run down. Starter 2 normally comes to a standstill at a later time $t_{SO}$ than internal combustion engine 1 at time $t_{BO}$. This can have the disadvantage that in the event of a start request between the end of time period $t_3$ and time $t_{SO}$, one must wait until time $t_{SO}$ before being able to restart internal combustion engine 1. This disadvantage may be removed if starter 2, as shown in FIG. 1, is developed as having a mechanical or electromechanical braking device 17, which is controlled by starter control 6. If starter 2 can be braked, then it is ready to be started at least by time $t_{BO}$. According to a preferred operating strategy, braking device 17 is used in order to slow the rotational speed of starter 2 over time in parallel to the rotational speed n of the internal combustion engine corresponding to characteristic curve 16. Thus it is possible to establish practically at any time a mechanical connection to internal combustion engine 1, which may subsequently be started by starter 2. Instead of braking device 17, the starter pinion may also be engaged in ring gear 5.

Figure 4:
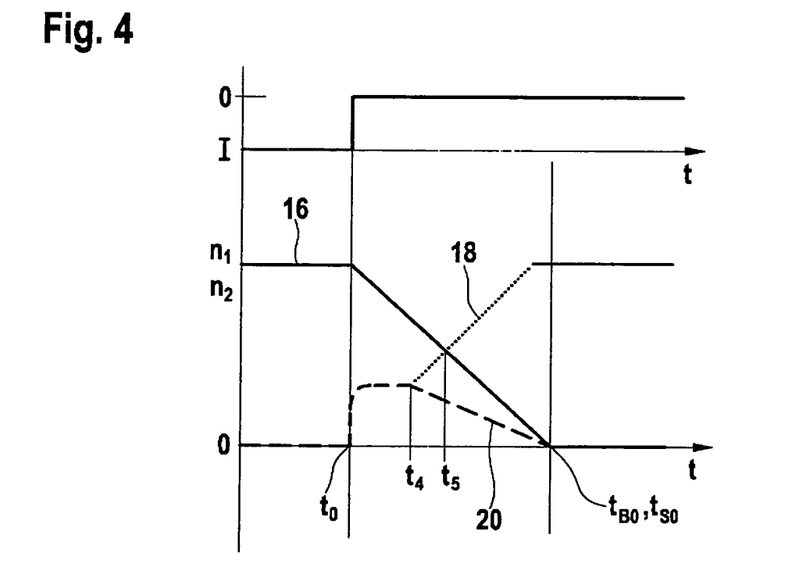
FIG. 4 shows a time-rotational speed diagram according to the third operating strategy including a start signal.

FIG. 4 shows a third alternative operating strategy, in which the rotational speed of starter 2 is reduced in that starter 2 is energized with a fraction of the power and start-stop control 14 checks whether a start signal is detected within a defined fourth time period $t_4$ in order to accelerate the rotational speed of starter 2 to the falling rotational speed of internal combustion engine 1 and to engage a starter pinion 4 by clutch device 3 into ring gear 5 of internal combustion engine 1 at an essentially synchronous rotational speed of the two gears by time $t_5$. This case of the operating strategy is represented as dotted characteristic curve 18. Characteristic curve 18 stands for an engaged state. If, on the contrary, start-stop control 14 does not receive a start signal by the end of fourth time period $t_4$, then starter 2 is no longer energized such that rotational speeds $n_1$, $n_2$ of internal combustion engine 1 and starter 2 are at 0 essentially at the same time. The times of FIG. 3, $t_{BO}$ and $t_{SO}$, essentially coincide.

As shown in FIG. 4, starter 2 is energized at the time of the switch-off signal from internal combustion engine 1, that is, signal 0 at time $t_0$. In a departure from the representation in FIG. 4, as in FIG. 3, starter 2 may be energized with a lesser current after the expiration of time $t_1$, for example within a time period $t_2$. The selection of the operating strategy depends on various influencing variables, in particular the selection of starter 2 and the type of internal combustion engine 1.

Figure 5:
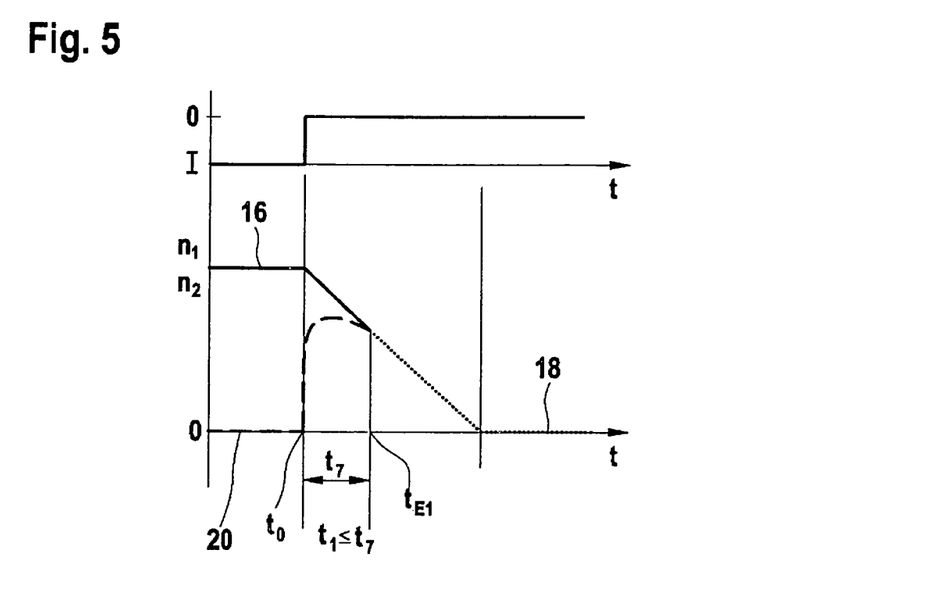
FIG. 5 shows a time-rotational speed diagram according to a fourth operating strategy.

FIG. 5 shows a fourth operating strategy, according to which starter 2 is energized immediately in the event of a switch-off signal 0 from internal combustion engine 1 at time $t_0$, cf. characteristic curve 20, and is accelerated to a rotational speed $n_2$ in order to be engaged as quickly as possible in synchronized fashion with falling rotational speed $n_1$ of internal combustion engine 1, cf. characteristic curve 16. Clutch device 3 always engages starter pinion 4 into ring gear 5. Following the expiration of time period $t_7$, starter 2 is thus always able to restart at any time after time $t_{E7}$. Characteristic curve 18 shows the engaged time-rotational speed curve $n_1$, $n_2$ of internal combustion engine 1 and starter 2. It is no longer necessary to wait for internal combustion engine 1 to come to a standstill.

FIG. 5 shows the particular case, in which no start signal is detected in the represented time period and internal combustion engine 1 is restarted only after coming to a standstill.

Figure 6:
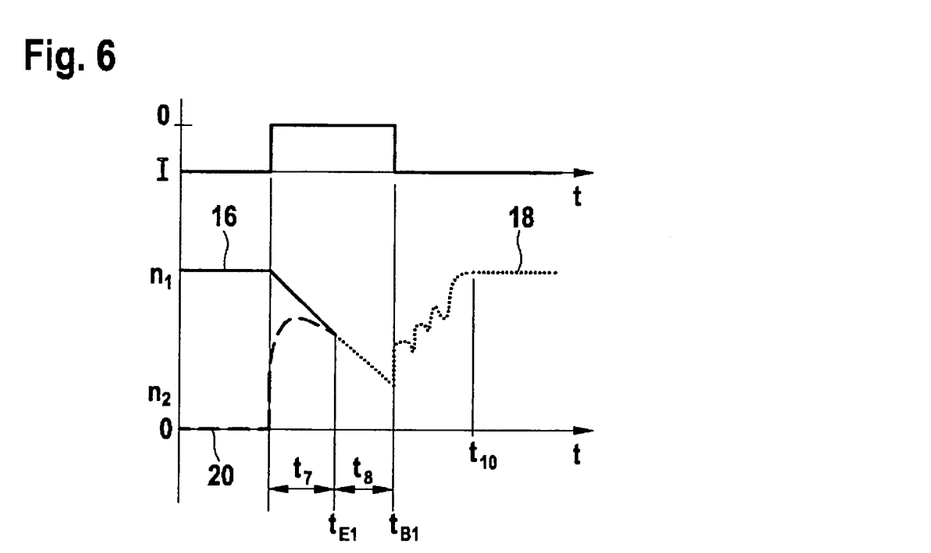
FIG. 6 shows a time-rotational speed diagram according to a fourth operating strategy including a start signal.

FIG. 6 shows the operating strategy from FIG. 5 with the difference that a start signal occurs within time period $t_8$ following the engagement at time $t_{E1}$, before internal combustion engine 1 is at a standstill, and that internal combustion engine 1 is thus able to be started earlier. At time $t_{B1}$, start-stop control 14 detects a switch-on signal 1 for starting internal combustion engine 1. According to dotted characteristic curve 18, internal combustion engine 1 reaches the defined idling speed at time $t_{10}$.

Figure 7:
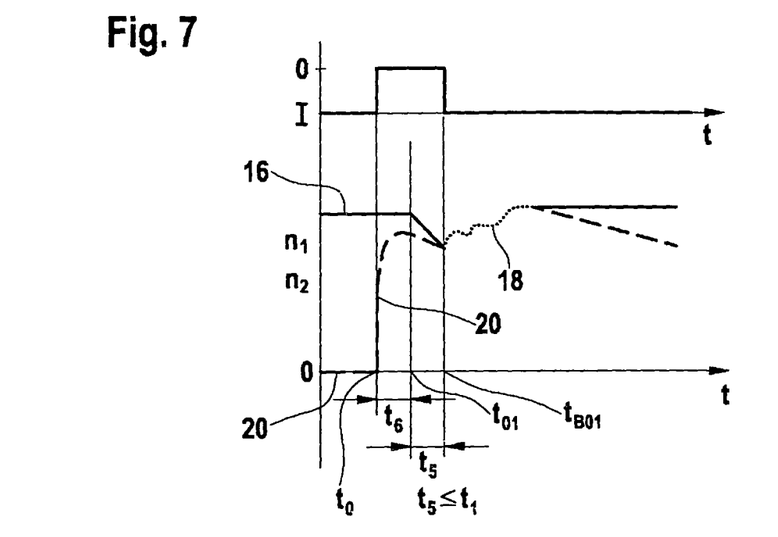
FIG. 7 shows a time-rotational speed diagram according to a fifth operating strategy.

FIG. 7 shows a fifth operating strategy, according to which start-stop control 14, following the detection of a stop signal 0 for internal combustion engine 1 at time $t_0$, internal combustion engine 1 is not immediately stopped, but rather starter 2 is energized first and accelerated to a rotational speed $n_2$ such that an engagement at a lower rotational speed $n_1$ than the idling speed is possible following the switch-off of internal combustion engine 1 at a later time $t_{B01}$. Thus an engagement at a considerably higher rotational speed $n_1$, $n_2$ is possible such that a start signal for internal combustion engine 1 is implementable at an earlier point in time, for example at time $t_{B01}$ as contrasted to time $t_{B1}$ from FIG. 6, such that starter 2 brings internal combustion engine 1 considerably more quickly to the required idling speed $n_1$ in order to start internal combustion engine 1. Thus, according to this fifth operating strategy, upon reception of an "engine off" signal, first starter 2 is energized and accelerated, and then internal combustion engine 1 is switched off following the expiration of a certain time period $t_6$. Time period $t_8$ from FIG. 6, now indicated as $t_5$, thus commences considerably earlier. Internal combustion engine 1 is able to be restarted at any time since time period $t_5$ is shorter than time period $t_1$ from the operating strategy shown in FIG. 2.

Figure 8:
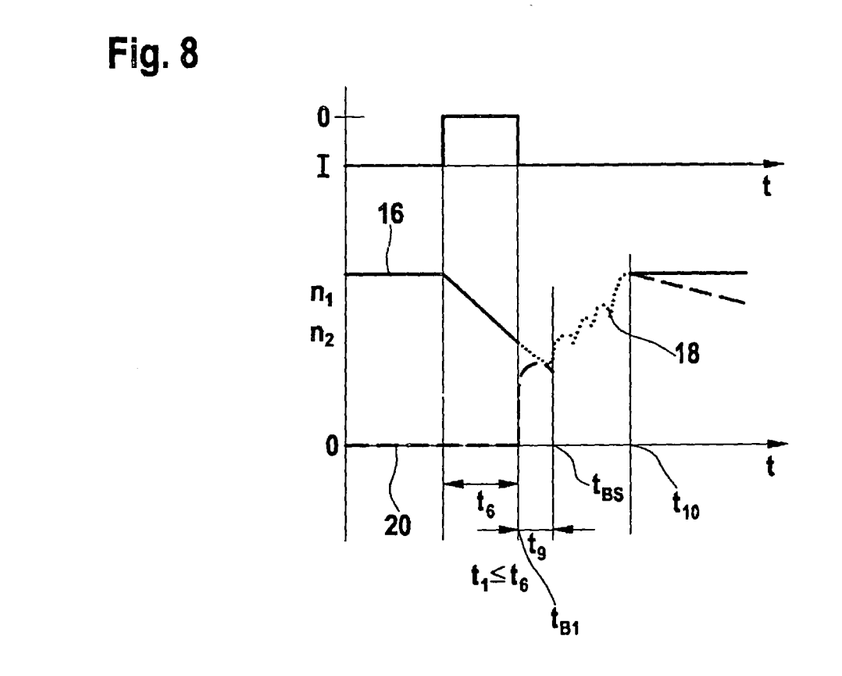
FIG. 8 shows a time-rotational speed diagram according to a sixth operating strategy.

FIG. 8 shows another possibility of a sixth operating strategy with the aim of achieving, at the expense of performance, an optimization of the service life of the start-stop device including the clutch device and the electric machine, to implement a rapidly changing operating behavior of internal combustion engine 1. According to the sixth operating strategy and characteristic curve 20, starter 2 is energized only when a start signal for internal combustion 1 is detected by start-stop control 14 by time $t_{B1}$. It is clear that time $t_{B1}$ is greater than or equal to time period $t_1$ according to the first operating strategy from FIG. 2. That is to say, starter 2 is required to restart internal combustion engine 1. Within a specific time period $t_9$, starter 2 reaches a synchronous rotational speed with respect to falling engine speed $n_1$ according to characteristic curve 16 of internal combustion engine 1 by time $t_{BS}$, which is prior to a time at which internal combustion engine 1 is at a standstill. Following the engagement at a synchronous rotational speed of the starter pinion into the ring gear of internal combustion engine 1 by time $t_{BS}$, the starter requires, according to dotted characteristic curve 18, until time $t_{10}$ a time in order to accelerate the rotational speed $n_1$ of internal combustion engine 1 in such a way that internal combustion engine 1 runs on its own. An operating strategy as shown in FIG. 8 has a greatly reduced wear since the restart function is executed only in the event that a start signal is actually detected by start-stop control 14. A small starter time extension of $t_{BS}$ minus $t_1$ is thus possible.

By individually regulating the selection of operating strategies, between comfort and service life, it is possible to vary individually depending on the customer's request and the location of the use of the vehicle. By using an operating strategy during a period from the time of switching off the internal combustion engine until a standstill of the internal combustion engine it is possible to perform a rapid change of the operating behavior of the internal combustion engine. Internal combustion engine 1 thus responds more quickly to driver's request for acceleration or a start.

Selected preferred operating strategies were represented by way of excerpts in FIGS. 2 through 8. It is understood that there are combinations and variations of these presented operating strategies that also fall within the protective scope of the present invention since an energization of the starter, and engagement of the starter with the internal combustion engine, and a switch-off and start of the internal combustion engine are controlled separately of one another possibly as a function of reaching a rotational speed and/or of reaching a defined point in time within the time period, within which the internal combustion engine is still at a standstill.

All figures show only schematic illustrations that are not to scale. In other respects, we refer especially to the drawings as being essential representations of the present invention.

What is claimed is:

1. A method of a start-stop control for an internal combustion engine in a motor vehicle, comprising:
    switching off, using an engine control, the internal combustion engine if at least one predetermined switch-off condition is present;
    after the switching off, monitoring whether an engine start signal is present, wherein the internal combustion engine is restarted in response to the engine start signal using an electric machine as a starter; and
    within a predefined time period until the internal combustion engine comes to a standstill following the switching off, providing a control operation for the internal combustion engine using a predetermined operating strategy, wherein the predetermined operating strategy has a defined specification regarding the time of actuation of a clutch device associated with the internal combustion engine and the electric machine, wherein the electric machine and the internal combustion engine are mechanically connected by engaging the clutch;
    wherein upon one of (i) reaching a predetermined non-zero rotational speed of the internal combustion engine after the switching off without detecting the engine start signal, or (ii) expiration of a predefined first time period after the switching off without detecting the engine start signal, the electric machine and the clutch device are acted upon by the predetermined operating strategy in such a way that the electric machine is energized and accelerated, and a check is performed whether the engine start signal is detected within a predefined second time period in which the internal combustion engine is still rotating at a non-zero rotational speed, the second time period being greater than the first time period, in order to actuate the clutch device for engaging the electric machine with the internal combustion engine.

2. The method as recited in claim 1, wherein the electric machine is energized with a predetermined fraction of available power, and a check is performed whether the engine start signal is detected within a third time period in order to accelerate the rotational speed of the electric machine to a falling rotational speed of the internal combustion engine, and the electric machine is engaged by the clutch device at a substantially synchronous rotational speed with the internal combustion engine.

3. The method as recited in claim 2, wherein the electric machine is energized with the predetermined fraction of available power until it is determined that the engine start signal has not been detected within the third time period, at which time the electric machine is switched off such that the electric machine comes to a standstill at substantially the same time as the switched-off internal combustion engine.

4. A non-transitory computer-readable data storage medium storing a computer program having program instructions which, when executed on a computer, performs a method of a start-stop control for an internal combustion engine in a motor vehicle, the method comprising:
  switching off, using an engine control, the internal combustion engine if at least one predetermined switch-off condition is present;
  after the switching off, monitoring whether an engine start signal is present, wherein the internal combustion engine is restarted in response to the engine start signal using an electric machine as a starter; and
  within a predefined time period until the internal combustion engine comes to a standstill following the switching off, providing a control operation for the internal combustion engine using a predetermined operating strategy, wherein the predetermined operating strategy has a defined specification regarding the time of actuation of a clutch device associated with the internal combustion engine and the electric machine, wherein the electric machine and the internal combustion engine are mechanically connected by engaging the clutch;
  wherein upon one of (i) reaching a predetermined non-zero rotational speed of the internal combustion engine after the switching off without detecting the engine start signal, or (ii) expiration of a predefined first time period after the switching off without detecting the engine start signal, the electric machine and the clutch device are acted upon by the predetermined operating strategy in such a way that the electric machine is energized and accelerated, and a check is performed whether the engine start signal is detected within a predefined second time period in which the internal combustion engine is still rotating at a non-zero rotational speed, the second time period being greater than the first time period, in order to actuate the clutch device for engaging the electric machine with the internal combustion engine.

5. A start-stop control unit for an internal combustion engine in a vehicle, comprising:
  means for switching off, using an engine control, the internal combustion engine if at least one predetermined switch-off condition is present;
  means for monitoring, after the switching off, whether an engine start signal is present, wherein the internal combustion engine is restarted in response to the engine start signal using an electric machine as a starter; and
  means for providing, within a predefined time period until the internal combustion engine comes to a standstill following the switching off, a control operation for the internal combustion engine using a predetermined operating strategy, wherein the predetermined operating strategy has a defined specification regarding the time of actuation of a clutch device associated with the internal combustion engine and the electric machine, wherein the electric machine and the internal combustion engine are mechanically connected by engaging the clutch;
  wherein upon one of (i) reaching a predetermined non-zero rotational speed of the internal combustion engine after the switching off without detecting the engine start signal, or (ii) expiration of a predefined first time period after the switching off without detecting the engine start signal, the electric machine and the clutch device are acted upon by the predetermined operating strategy in such a way that the electric machine is energized and accelerated, and a check is performed whether the engine start signal is detected within a predefined second time period in which the internal combustion engine is still rotating at a non-zero rotational speed, the second time period being greater than the first time period, in order to actuate the clutch device for engaging the electric machine with the internal combustion engine.

\* \* \* \* \*